United States Patent
Aurisicchio et al.

(10) Patent No.: US 10,035,905 B2
(45) Date of Patent: Jul. 31, 2018

(54) RUBBER COMPOUNDS CONTAINING SILICON DIOXIDE FOR THE PRODUCTION OF TYRES

(71) Applicant: BRIDGESTONE CORPORATION, Tokyo (JP)

(72) Inventors: Claudia Aurisicchio, Rome (IT); Valeria Grenci, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 54 days.

(21) Appl. No.: 15/115,934

(22) PCT Filed: Feb. 3, 2015

(86) PCT No.: PCT/IB2015/050821
§ 371 (c)(1),
(2) Date: Aug. 2, 2016

(87) PCT Pub. No.: WO2015/114610
PCT Pub. Date: Aug. 6, 2015

(65) Prior Publication Data
US 2017/0166733 A1    Jun. 15, 2017

(30) Foreign Application Priority Data

Feb. 3, 2014 (IT) .............................. RM2014A0050

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/02* (2013.01); *C08L 2205/03* (2013.01)

(58) Field of Classification Search
CPC .... C08L 9/06; C08L 2205/02; C08L 2205/03; B60C 1/0016
See application file for complete search history.

(56) References Cited

U.S. PATENT DOCUMENTS

| | | | | |
|---|---|---|---|---|
| 4,210,475 | A | * 7/1980 | Neubert | C08J 5/06 152/451 |
| 2009/0099281 | A1 | * 4/2009 | Sakurai | B60C 1/0008 524/76 |
| 2012/0302664 | A1 | * 11/2012 | Kamada | B60C 1/0016 523/156 |
| 2015/0314644 | A1 | * 11/2015 | Grassi | B60C 1/00 152/537 |

FOREIGN PATENT DOCUMENTS

EP    2 223 928 A1    9/2010

OTHER PUBLICATIONS

Pan et al, Synthesis and Characterization of Aminated Lignin, International Journal of Biological Macromolecules, vol. 59 pp. 22-226 (2013).*
International Search Report for PCT/IB2015/050821 dated Jul. 22, 2015.
Written Opinion for PCT/IB2015/050821 dated Jul. 22, 2015.

* cited by examiner

*Primary Examiner* — Alexander Kollias
(74) *Attorney, Agent, or Firm* — Sughrue Mion, PLLC

(57) ABSTRACT

A rubber compound containing silicon dioxide for the production of tires, comprising at least one polymer base with cross-linkable unsaturated chain, silicon dioxide, a silane bonding agent, a vulcanization system and lignin comprising, in turn, at least part of its aromatic rings substituted with amine substituents.

10 Claims, No Drawings

RUBBER COMPOUNDS CONTAINING SILICON DIOXIDE FOR THE PRODUCTION OF TYRES

CROSS REFERENCE TO RELATED APPLICATIONS

This application is a National Stage of International Application No. PCT/IB2015/050821 filed Feb. 3, 2015, claiming priority based on Italian Patent Application No. RM2014A000050 filed Feb. 3, 2014, the contents of all of which are incorporated herein by reference in their entirety.

TECHNICAL FIELD

The present invention concerns rubber compounds containing silicon dioxide for the production of tyres.

BACKGROUND ART

The use of silicon dioxide as a reinforcing filler in compounds for tyres, in particular for treads, has been known for some time.

Silicon dioxide is used to partially or totally substitute carbon black due to its advantages in terms of rolling resistance and wet grip. The use of silicon dioxide entails a series of drawbacks due to the difficulty of dispersion of the silicon dioxide in the polymer base. This problem derives from the presence on the silicon dioxide of surface silane groups, which favour the formation of hydrogen bonds and, therefore, silicon dioxide particle agglomerates, and give the silicon dioxide hydrophilic characteristics which have a low level of compatibility with the hydrophobic characteristics of the rubber. Poor dispersion of the silicon dioxide in the rubber compound causes extreme variability and heterogeneity of the physical-mechanical characteristics of the compound and, in particular, low resistance to wear. In order to solve the dispersion problems described above, the use of silane bonding agents has been known for some time; said agents inhibit the formation of the above-mentioned hydrogen bonds by bonding with the silanol groups and, at the same time, they chemically bond the silicon dioxide to the polymer base.

Furthermore, the use silicon dioxide requires the presence of specific plasticizers in the compound to favour the processability of the compound.

The need was felt for a solution that favoured improvement of the rolling resistance and wear resistance of the compounds containing silicon dioxide and which, at the same time, was favourable to the processability of the compound thus also avoiding the use of plasticizers.

Lignin is one of the natural polymers that form wood, of which it constitutes 33% by weight. Lignin is insoluble in apolar and organic solvents, and it can be separated from the cellulose by means of a sulphonation process. The lignin is solubilised as calcium salt or sodium salt of lignin sulfonic acid, while the cellulose remains unchanged and, once separated, is used in the production of paper or other cellulosic articles.

Studies of solutions for the use of lignin as a by-product of wood in the production of paper have been ongoing for some time now. In said regard it must be specified that disposal of the lignin represents a limiting stage in the paper production chain.

DISCLOSURE OF INVENTION

The subject of the present invention is a rubber compound containing silicon dioxide for the production of tyres; said rubber compound comprising at least one polymer base with cross-linkable unsaturated chain, silicon dioxide, a silane bonding agent and a vulcanization system; said compound being characterised in that it comprises lignin comprising at least part of its aromatic rings substituted with amine substituents.

Preferably, said amine substituents are comprised in the formula $-R_1NR_2R_3$ wherein:

$R_1$ is (CH2)n with n ranging from 1 to 4.

$R_2$ and $R_3$, which are equal to or different from each other, are chosen between H, $(CH_2)nCH_3$ with n ranging from 0 to 4.

Preferably, one of $R_2$ and $R_3$ is H.

Preferably, the lignin is used in the rubber compound in a quantity ranging from 1 to 15 phr.

A further subject of the present invention is a tyre portion manufactured with the rubber compound subject of the present invention.

Preferably, said tyre portion is a tread.

A further subject of the present invention is a tyre comprising a portion as defined above.

A further subject of the present invention is the use of lignin comprising at least part of its aromatic rings substituted with amine substituents in rubber compounds for the production of tyres.

BEST MODE FOR CARRYING OUT THE INVENTION

For a better understanding of the present invention, embodiment examples are provided below for illustrative non-limiting purposes.

Four rubber compounds were produced, of which one (Compound A) was produced according to the teachings of the present invention, while the other three (Compounds B-D) provide comparison examples.

In particular, comparison Compound B is distinguished from Compound A due to absence of the lignin substituted with amine substituents and due to the presence of a plasticizer; comparison Compound C is distinguished from Compound A due to the absence of the substituted lignin; comparison Compound D is distinguished from Compound A due to the absence of the lignin substituted with amine substituents and due to the presence of non-substituted lignin.

The compounds of the examples were prepared according to a standard procedure, which is not relevant for the purposes of the present invention.

—Preparation of the Compounds—

(1st Mixing Stage)

In a tangential rotor mixer with internal volume ranging from 230 to 270 liters, the following were loaded before beginning of the mixing: the polymer base, the silicon dioxide together with the silane bonding agent and, when scheduled, the substituted lignin or the non-substituted lignin or the plasticizer, reaching a fill factor ranging from 66% to 72%.

The mixer was operated at a speed ranging from 40 to 60 r.p.m., and the mixture formed was discharged once a temperature ranging from 145 to 165° C. had been reached.

(2nd Mixing Stage)

The mixture obtained from the preceding stage was processed again in the mixer operated at a speed ranging from 40 to 60 r.p.m. and, subsequently, discharged once a temperature ranging from 130 to 150° C. had been reached.

(3rd Mixing Stage)

Stearic acid and the vulcanization system composed of sulphur, accelerators and zinc oxide were added to the mixture obtained from the preceding stage, reaching a fill factor ranging from 63 to 67%.

The mixer was operated at a speed ranging from 20 to 40 r.p.m., and the mixture formed was discharged once a temperature ranging from 100 to 110° C. had been reached.

Table I shows the compositions of the Compounds A-D.

TABLE I

|  | A | B | C | D |
| --- | --- | --- | --- | --- |
| S-SBR |  | 50.0 |  |  |
| E-SBR |  | 40.0 |  |  |
| BR |  | 10.0 |  |  |
| Silicon dioxide |  | 77.5 |  |  |
| Silane bonding agent |  | 7.3 |  |  |
| Zn oxide |  | 1.7 |  |  |
| Sulphur |  | 1.9 |  |  |
| DPG |  | 1.2 |  |  |
| MBTS |  | 1.3 |  |  |
| TBBS |  | 0.9 |  |  |
| Stearic acid |  | 1.0 |  |  |
| Plasticizer | — | 2.0 | — | — |
| Non-substituted lignin | — | — | — | 2.0 |
| Substituted lignin | 2.0 | — | — | — |

E-SBR is a polymer base obtained by means of a process of polymerization in emulsion with a mean molecular weight ranging from 800 to $1500 \times 10^3$ and from 500 to $900 \times 10^3$ respectively, with a styrene content ranging from 20 to 45% and used with an oil content ranging from 0 to 30%.

S-SBR is a polymer base obtained by means of a polymerization process in solution with a mean molecular weight ranging from 800 to $1500 \times 10^3$ and from 500 to $900 \times 10^3$ respectively, with styrene content ranging from 20 to 45%.

The silicon dioxide used is sold under the name VN3 by the company EVONIK and has a surface area of approximately 170 m²/g.

The silane bonding agent used has a formula $(CH_3CH_2O)_3 Si(CH_2)_3SS(CH_2)_3Si(OCH_2CH_3)_3$ and is sold under the name SI75 by the company EVONIK.

DPG is the abbreviation of the compound diphenylguanidine.

MBTS is the abbreviation of the compound mercaptobenzothiazole disulfide.

TBBS is the abbreviation of the compound N-terz-butyl-2-benzothiazyl sulfenamide.

The plasticizer used is Silica Additive 9202 sold by the company KREMS CHEMIE CHEMICAL SERVICE AG.

The non-substituted lignin used is Borresperse NA sold by the company BORREGAARD.

The substituted lignin was produced with the non-limiting procedure described below, in which the Mannich reaction was used:

100 mg of non-substituted lignin were dissolved in a solution composed of 10 ml of 1,4-dioxane and 4 ml of acetic acid. 1.6 mmol of dimethylamine and 1.1 mmol of formaldehyde were added to the resulting solution. The resulting solution was maintained for 24 hours under stirring at a temperature of 60° C. The product obtained was extracted with ethylacetate, then removed by evaporation.

The compounds reported in Table I underwent viscosity measurement and, once vulcanized, measurement of the rolling resistance, silicon dioxide dispersion index and abrasion resistance. In particular, the rolling resistance and silicon dioxide dispersion derive from the dynamic properties of the compounds. In fact, the rolling resistance parameter is correlated with the values of tan δ at 60° C.: the lower the value of tan δ at 60° C., the better the rolling resistance; the dispersion index is given by the ratio $100 \times \Delta E'/E'_{0.1\%\ strain}$, wherein the $\Delta E'$ is given by the difference $E'_{0.1\%\ strain} - E'_{4.0\%\ strain}$. The lower the dispersion index, the better the dispersion of the silicon dioxide in the polymer matrix.

The viscosity was measured according to the ASTM 1646 standard, the dynamic properties were measured according to the ASTM D5992 standard and the abrasion resistance was measured according to the DIN 53516 standard.

Table II gives the values of the above measurements indexed to the values of the comparison compound B.

TABLE II

|  | A | B | C | D |
| --- | --- | --- | --- | --- |
| Viscosity | 100 | 100 | 120 | 100 |
| Dispersion index | 85 | 100 | 120 | 100 |
| Rolling resistance | 115 | 100 | 80 | 100 |
| Abrasion resistance | 110 | 100 | 105 | 100 |

For a more immediate assessment of the values reported in Table I, it must be specified that for the viscosity and dispersion index parameters, the lower the corresponding values, the more preferable they are; for the rolling resistance and abrasion resistance parameters, the higher the corresponding values, the more preferable they are.

From the values reported in Table II it can be seen that the presence of the substituted lignin according to the present invention is able to impart in the compound a better dispersion of the silicon dioxide, thus obtaining improved rolling resistance and improved abrasion resistance. In addition to the advantages deriving from improved dispersion of the silicon dioxide, the values of Table II also show that the presence of the substituted lignin according to the present invention gives the compound a viscosity equal to that obtained due to the presence of the plasticizer, with the consequence that the latter may not necessarily have to be used.

It is also important to note that although the non-substituted lignin is able to give the compound a viscosity comparable to that obtained in the presence of the plasticizer, it is not able to provide a dispersion of the silicon dioxide as guaranteed by the presence of the substituted lignin.

Lastly, for a more complete assessment of the present invention, it should be considered that the same allows the use of a by-product of the paper industry which would otherwise be disposed of, with the consequent advantages in terms of costs and benefit to the environment.

The invention claimed is:

1. A rubber compound containing silicon dioxide for the production of tires, the rubber compound comprising:
   at least one polymer base with a cross-linkable unsaturated chain, silicon dioxide;
   a silane bonding agent;
   a vulcanization system; and
   lignin, wherein at least part of the aromatic rings of the lignin are substituted with amine substituents.

2. The rubber compound according to claim 1, wherein the amine substituents are of the formula:

wherein
   $R_1$ is $(CH_2)_n$ where n is from 1 to 4, and
   $R_2$ and $R_3$, are the same or different and are selected from the group consisting of H and $(CH_2)_nCH_3$, where n is from 0 to 4.

3. The rubber compound according to claim 2, wherein $R_2$ or $R_3$ is H.

4. The rubber compound according to claim 1, wherein the lignin is present the rubber compound in a amount from 1 to 15 phr.

5. A tire portion manufactured with the rubber compound according to claim 1.

6. The tire portion according to claim 5, where the tire portion is a tread.

7. A tire comprising the tire portion according to claim 5.

8. A method of making a rubber compound for the production of tires, comprising providing silicon dioxide and lignin, wherein at least part of the aromatic rings of the lignin are substituted with amine substituents.

9. The method according to claim 8, wherein the amine substituents are of the formula:

—$R_1NR_2R_3$, wherein
$R_1$ is $(CH_2)_n$ where n is from 1 to 4, and
$R_2$ and $R_3$, are the same or different and are selected from the group consisting of H and $(CH_2)_nCH_3$, where n is from 0 to 4.

10. The method according to claim 9, wherein the aromatic rings are substituted with secondary amine substituents.

* * * * *